(12) United States Patent
Dev Mahadevaiah et al.

(10) Patent No.: US 12,264,629 B2
(45) Date of Patent: Apr. 1, 2025

(54) AIR TURBINE STARTER WITH DECOUPLER

(71) Applicant: Unison Industries, LLC, Jacksonville, FL (US)

(72) Inventors: Narendra Dev Mahadevaiah, Bengaluru (IN); Sharad Pundlik Patil, Bengaluru (IN); Pallavi Tripathi, Bengaluru (IN); Subrata Nayak, Bengaluru (IN); Milind Chandrakant Dhabade, Bengaluru (IN); Shiloh Montegomery Meyers, Dayton, OH (US); David Allan Dranschak, Dayton, OH (US)

(73) Assignee: Unison Industries, LLC, Jacksonville, FL (US)

(*) Notice: Subject to any disclaimer, the term of this patent is extended or adjusted under 35 U.S.C. 154(b) by 0 days.

(21) Appl. No.: 18/436,698

(22) Filed: Feb. 8, 2024

(65) Prior Publication Data
US 2025/0027453 A1 Jan. 23, 2025

Related U.S. Application Data

(63) Continuation of application No. 17/889,066, filed on Aug. 16, 2022, now Pat. No. 11,959,421.

(30) Foreign Application Priority Data

May 23, 2022 (IN) .............. 202211029491

(51) Int. Cl.
*F02C 7/277* (2006.01)
*F01D 19/00* (2006.01)
*F01D 21/00* (2006.01)
*F01D 21/02* (2006.01)
*F01D 21/14* (2006.01)
*F16D 9/06* (2006.01)
*F16D 43/20* (2006.01)

(52) U.S. Cl.
CPC .............. *F02C 7/277* (2013.01); *F01D 19/00* (2013.01); *F01D 21/00* (2013.01); *F01D 21/02* (2013.01); *F01D 21/14* (2013.01); *F16D 9/06* (2013.01); *F16D 43/20* (2013.01)

(58) Field of Classification Search
CPC ... F02C 7/277; F16D 9/06; F16D 9/08; F01D 19/00; F01D 21/00; F01D 21/14
See application file for complete search history.

(56) References Cited

U.S. PATENT DOCUMENTS 2,728,234 A 12/1955 Volk, Jr.
4,871,296 A * 10/1989 Laessle ..................... F16D 9/04
60/788

(Continued)

*Primary Examiner* — Kyle Robert Thomas
(74) *Attorney, Agent, or Firm* — McGarry Bair PC (57) ABSTRACT

An air turbine starter with a housing; a turbine member located within the housing; a drive shaft operably coupled to the turbine member, and having an interior portion. The air turbine starter output shaft extending between a first end and a second end, the output shaft movable between a first position, where the first end is coupled to the engine, and a second position, where the second end is retained within the interior portion and the first end is uncoupled from the engine. A decoupler assembly is included for decoupling the output shaft from the engine.

20 Claims, 6 Drawing Sheets

(56) References Cited

U.S. PATENT DOCUMENTS

| | | | |
|---|---|---|---|
| 6,059,085 A | 5/2000 | Farnsworth | |
| 6,681,579 B2 | 1/2004 | Lane | |
| 8,105,018 B2 | 1/2012 | Gockel | |
| 10,519,865 B2 | 12/2019 | Rodriguez | |
| 10,584,640 B2 | 3/2020 | Rodriguez | |
| 11,333,078 B2 * | 5/2022 | Nayak | F02C 7/36 |
| 2017/0363010 A1 | 12/2017 | Rodriguez | |
| 2018/0030900 A1 | 2/2018 | Mathis | |
| 2019/0032566 A1 | 1/2019 | Martinez | |
| 2019/0331029 A1 * | 10/2019 | Nayak | F02C 7/32 |
| 2021/0093164 A1 | 4/2021 | Iyoshi | |
| 2021/0301728 A1 | 9/2021 | Nayak | |

* cited by examiner

AIR TURBINE STARTER WITH DECOUPLER

CROSS-REFERENCE TO RELATED APPLICATION(S)

This application is a continuation of U.S. patent application Ser. No. 17/889,066, filed Aug. 16, 2022, now allowed, which claims priority to and the benefit of Indian Provisional Patent Application No. 202211029491, filed May 23, 2022, all of which are hereby incorporated by reference in their entirety.

TECHNICAL FIELD

The present subject matter relates generally to an air turbine starter, and more specifically to a decoupler for an air turbine starter.

BACKGROUND

An aircraft engine, for example a gas turbine engine, is engaged to an air turbine starter in regular operation. The internal components of both the gas turbine engine and the air turbine starter spin together and can each include gearboxes allowing for step down or step up ratios between consecutive parts. Backdrive events can occur when the engine drives the output shaft of the air turbine starter. Backdrive events can over spin a turbine rotor in the air turbine starter. Systems and methods to avoid over spinning the turbine rotor in the air turbine starter would be welcomed in the art.

DETAILED DESCRIPTION

The present disclosure is related to a driving mechanism generating kinetic motion in the form of a rotating shaft coupled with a piece of rotating equipment. One non-limiting example of a driving mechanism can include an air turbine starter rotationally driving various gears to start a gas turbine engine. The starter has various applications including starting a gas turbine engine and generating electrical power when the gas turbine engine is in operation. While the exemplary embodiment described herein is directed to application of a gas turbine engine and a starter, embodiments of the disclosure can be applied to any implementation of a driving mechanism that generates rotational motion at a driving output, and provides the rotational motion to another piece of rotating equipment.

The word "exemplary" may be used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" may be used herein to refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the term "upstream" may be used herein to refer to a location that is opposite the fluid flow direction, and the term "downstream" refers to a location that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Approximating language, may be used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

"Proximate" may be used herein is not limiting, rather a descriptor for locating parts described herein. Further, the term "proximate" means nearer or closer to the part recited than the following part. For example, a first hole proximate a wall means that the first hole is closer to the wall, for example, than a second hole is to the wall.

Figure 1:
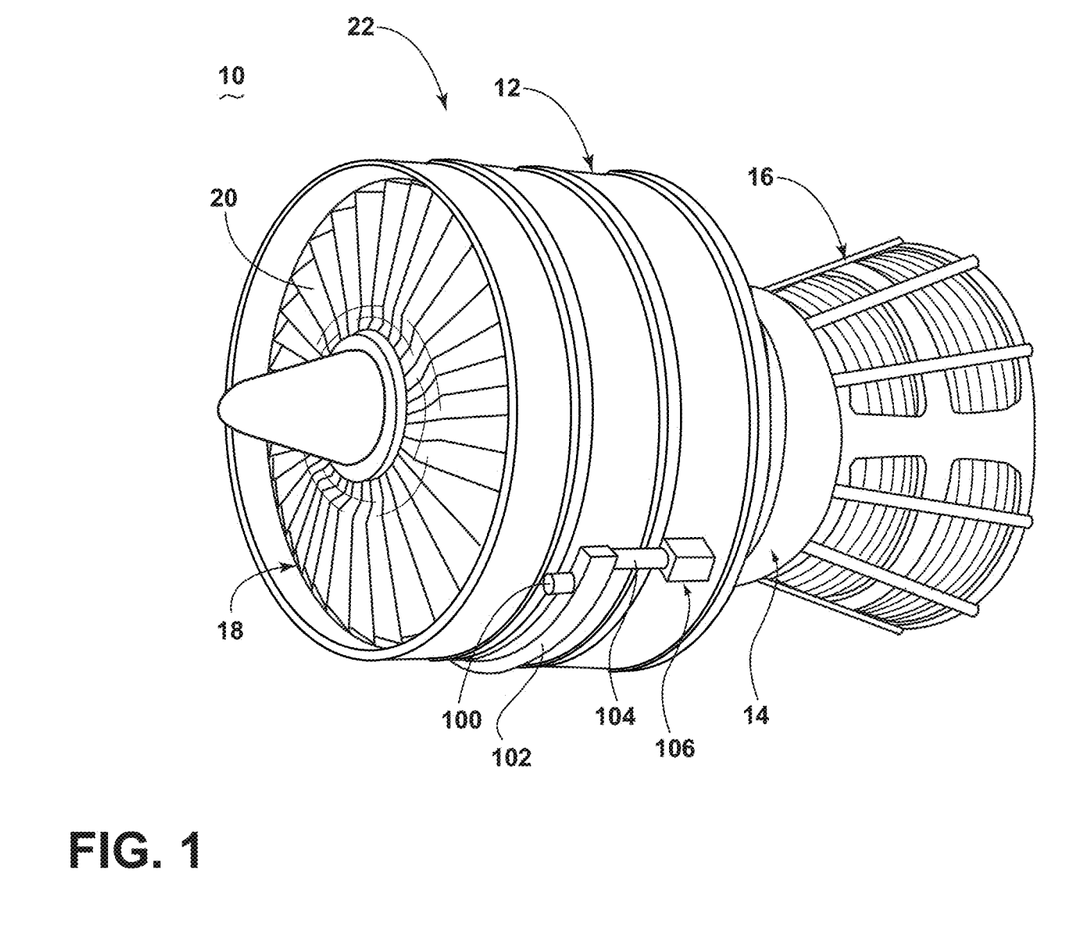
FIG. 1 is a schematic illustration of a gas turbine engine with an air turbine starter in accordance with various aspects described herein.

Referring to FIG. 1, a gas turbine engine 10 having a compressor section 12, a combustion section 14, and a turbine section 16 is illustrated. An air intake 18, defined by a fan 20, supplies air to the compressor section 12 of the engine 10. The air intake 18 and the compressor section 12 are collectively known as the 'cold section' 22 of the gas turbine engine 10 located upstream from the combustion section 14. The compressor section 12 provides the combustion section 14 with high-pressure air. The high-pressure air is mixed with fuel and combusted in a combustion chamber (not shown) in the combustion section 14 to form hot and pressurized combusted gasses. The hot and pressurized combusted gasses pass through the turbine section 16 before exhausting from the gas turbine engine 10. As the pressurized gasses pass through a high-pressure turbine (not shown) and a low-pressure turbine (not shown) of the turbine section 16, the turbines extract rotational energy from the flow of the gases passing through the gas turbine engine 10. The compressor section 12 and the turbine section 16 can be coupled to each other by way of a shaft to power the compressor section 12. The low-pressure turbine can be coupled to the fan 20 of the air intake 18 by way of a shaft to power the fan 20.

The gas turbine engine 10 can be a turbofan engine commonly used in modern commercial and military aviation or it could be a variety of other known gas turbine engines such as a turboprop or turboshaft. The gas turbine engine 10 can also have an afterburner that burns an additional amount of fuel downstream from the turbine section 16 to increase the velocity of the exhausted gases, and thereby increasing thrust.

A starter motor or an air turbine starter 100 can be drivingly coupled to the gas turbine engine 10 via an accessory gear box (AGB) 102, also known as a transmission housing, schematically illustrated as being mounted to the gas turbine engine 10. A horizontal drive shaft 104 can extend from the AGB 102 to a transfer gearbox 106. The AGB 102 can be coupled to a turbine shaft within the gas turbine engine 10, either to the low-pressure or high-pressure turbine by way of a radial drive shaft (not shown) extending from the transfer gearbox 106 into the gas turbine engine 10.

Figure 2:
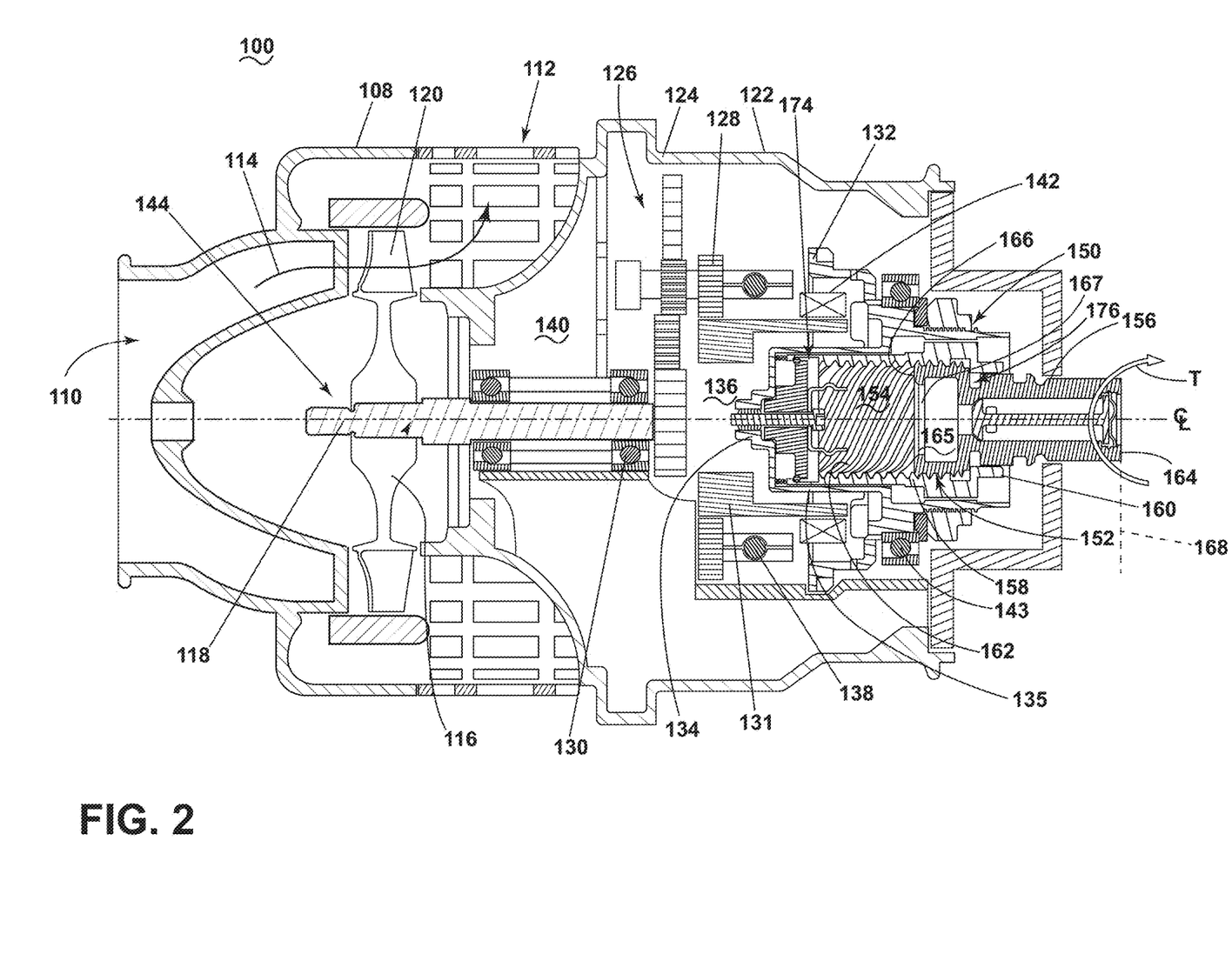
FIG. 2 is a sectional view of the air turbine starter with a decoupler in a first position according to an aspect of the disclosure described herein.

Referring now to FIG. 2, the air turbine starter 100 is shown in greater detail. The air turbine starter 100 can include a turbine housing 108 defining an inlet 110 and an outlet 112. A flow path 114 can extend between the inlet 110 and outlet 112 for communicating a flow of gas from the inlet 110 to the outlet 112. A turbine member 116 can include a turbine shaft 118 and a plurality of blades 120 extending from the turbine shaft 118. The turbine shaft 118 can be journaled within the turbine housing 108. The plurality of blades 120 can be disposed within the flow path 114 for rotatably extracting mechanical power from the flow of gas along the flow path 114.

A drive housing 122 can define at least a portion of a gear box 124. A gear train 126 can be disposed within the gear box 124 and be drivingly coupled with the turbine shaft 118. The gear train 126 can include a ring gear 128 and can further comprise any gear assembly including for example but not limited to a planetary gear assembly or a pinion gear assembly. The turbine shaft 118 can be rotatably mounted to the gear train 126 allowing for the transfer of mechanical power from the turbine member 116 to the gear train 126. The turbine shaft 118 can be supported by a pair of turbine bearings 130.

A carrier member 131 can be drivingly coupled with the gear train 126. A decoupler housing 132 can define a drive shaft assembly 135 and include a drive shaft 134 rotatably mounted to the carrier member 131. An aperture 136 in the carrier member 131 can receive the drive shaft 134. The carrier member 131 can be supported by carrier bearings 138. A housing interior 140 can contain oil to provide lubrication and cooling to mechanical parts contained therein such as the gear train 126, ring gear 128, and bearings 130, 138.

A clutch 142 can be mounted to the carrier member 131. The decoupler housing 132 is coupled to the clutch 142 and additionally supported by drive bearings 143. The decoupler housing 132 is driven by the carrier member 131 which in turn is driven by the gear train 126 which in turn is driven by the turbine member 116. The clutch 142 can be any type of shaft interface portion that forms a rotor 144 comprising the turbine member 116, the carrier member 131 and the decoupler housing 132. The shaft interface portion can be by any known method of coupling including, but not limited to, gears, splines, a clutch mechanism, or combinations thereof.

An output shaft 156 can extend between a first end 164 and a second end 166. During normal operation, the output shaft 156 is in a first position 168 where the first end 164 is coupled to the engine 10. By way of non-limiting example, the output shaft 156 can include a male threaded portion 158 at the second end 166. Further, the output shaft 156 can have a hollow portion 165 defining a lip 167 at the second end 166.

A hollow shaft 160 can be disposed within the drive shaft assembly 135. The hollow shaft 160 defining an interior portion 154 and extending between a closed end 174 and open end 176. The second end 166 of the output shaft 156 can be received in the hollow shaft 160 at the open end 176. The output shaft 156 being rotatably disposed (e.g., via a threaded connection) within the hollow shaft 160 at the second end 166. The hollow shaft 152 can be rotatably coupled to the drive assembly 135 via a spline connection 163. The decoupler housing 132, the hollow shaft 152, and the output shaft 156 are all rotatable about a singular rotational axis defining a centerline (CL).

A decoupler assembly 150 can be disposed within at least a portion of the decoupler housing 132. The decoupler assembly 150 can include a threaded interior 152, a portion of the output shaft 156 at the second end 166, and a retainer 170 (see FIG. 3) The threaded interior 152 can define at least a portion of the interior portion 154 of the hollow shaft 160. The male threaded portion 158 of the output shaft 156 can be received in the open end 176 of the hollow shaft 160. The threaded interior 152 being a female threaded portion 162 can be in threaded connection with the male threaded portion 158. The threaded interior 152 together with second end of the output shaft 156 and the retainer 170 can define the decoupler assembly 150.

The turbine housing 108 and the drive housing 122 can be formed by any known materials and methods, including, but not limited to, die-casting of high strength and lightweight metals such as aluminum, stainless steel, iron, or titanium. The turbine housing 108 and the drive housing 122 defining the starter 100 can be formed with a thickness sufficient to provide adequate mechanical rigidity without adding unnecessary weight to the full assembly and, therefore, the aircraft.

The rotor 144 can be constructed by any known materials and methods, including, but not limited to extrusion or machining of high strength metal alloys such as those containing aluminum, iron, nickel, chromium, titanium, tungsten, vanadium, or molybdenum. The diameter of the turbine shaft 118 and drive shaft 134 along with any other shafts defining the rotor 144 can be fixed or vary along the length of the rotor 144. The diameter can vary to accommodate different sizes, as well as rotor to stator spacings.

During operation air is introduced into the inlet 110, travels along the air flow path 114 causing the rotation of the turbine member 116. This rotation enables the passing along of mechanical energy through the rotor 144 to the AGB 102 and in turn to the engine 10 via the transfer gear box 106 (see FIG. 1). Upon starting the engine 10, the clutch 142 can disconnect the drive shaft 134 from the carrier member 131.

In the event of a backdrive, the clutch 142 causes the drive shaft 134 and the carrier member 131 to remain engaged. A backdrive event occurs when the output shaft 156 drives the drive shaft 134. In other words, the turbine rotation within the gas turbine engine 10 can cause a reverse driving torque, or a backdrive, through the various connections, the transfer gearbox 106 to the horizontal drive shaft 104 to the AGB 102, and eventually to the air turbine starter 100 via the output shaft 156. In a backdrive event where the clutch 142 and carrier member 131 cannot sustain the reverse order of driven components, it is beneficial to disengage the air turbine starter 100 from the AGB 102 as quickly as possible. The decoupler assembly 150 enables a smooth and seamless disconnection from the AGB interface 146.

Figure 3:
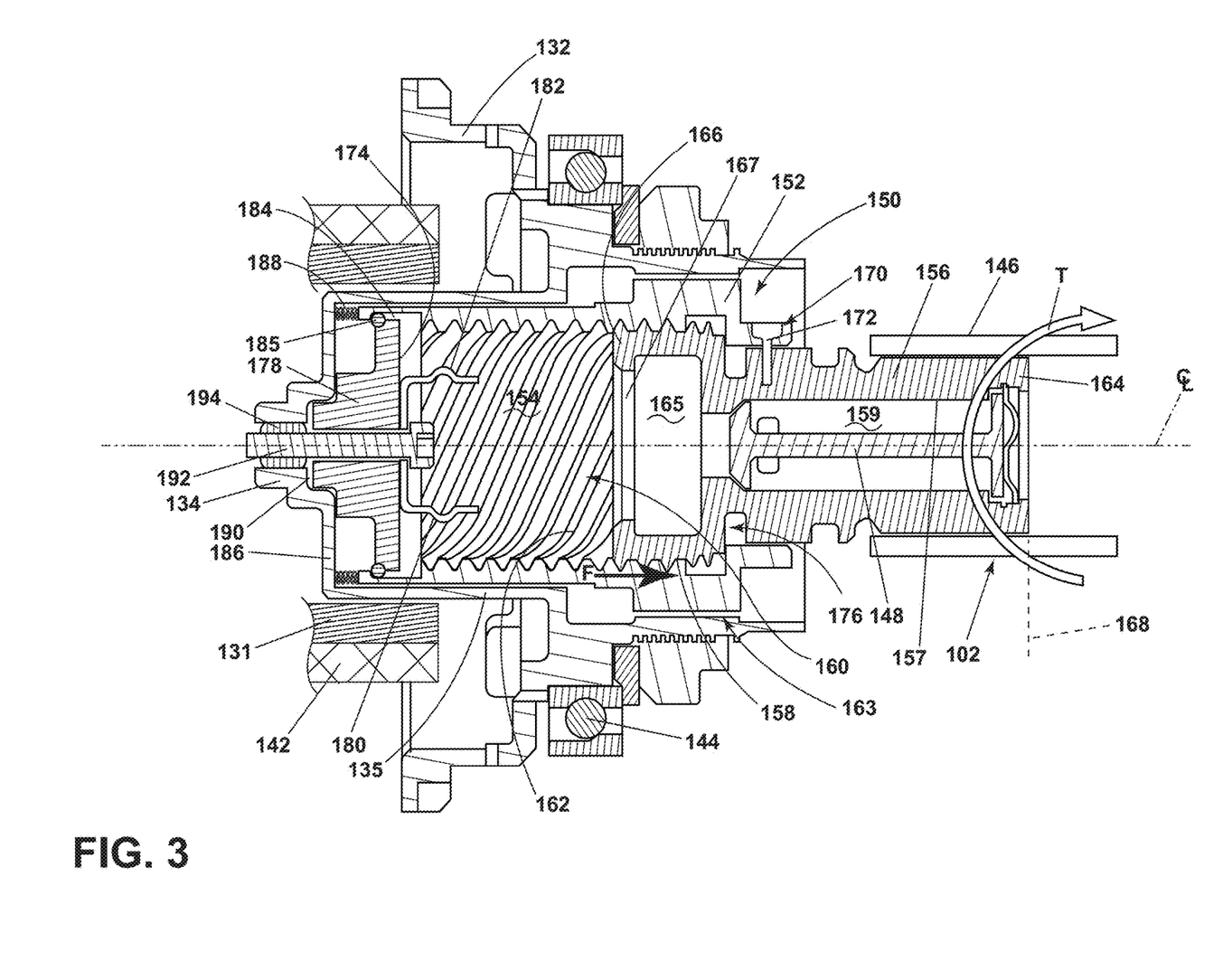
FIG. 3 is an enlarged view of the decoupler from FIG. 2 with a holder according to an aspect of the disclosure described herein.

FIG. 3 is an enlarged view of the decoupler assembly 150 from FIG. 2 in the first position 168 connected to an AGB interface 146. Under normal operating conditions a normal driving torque (T) is transferred to the AGB 102 from the output shaft 156 in the first position 168.

The decoupler assembly 150 can further include a retainer 170. The retainer 170 can be, by way of non-limiting example a shear pin 172. The shear pin 172 can extend through the hollow shaft 160 into the output shaft 156. The shear pin 172 has a yield strength that is based on the material of the shear pin 172 and a cross-sectional area that determines the amount of shear force that can be applied at the interface of the hollow shaft 160 and the output shaft 156, for example, by a torque applied to the output shaft 156. The shear force that the shear pin 172 can withstand can be referred to as a threshold strength.

Figure 5:
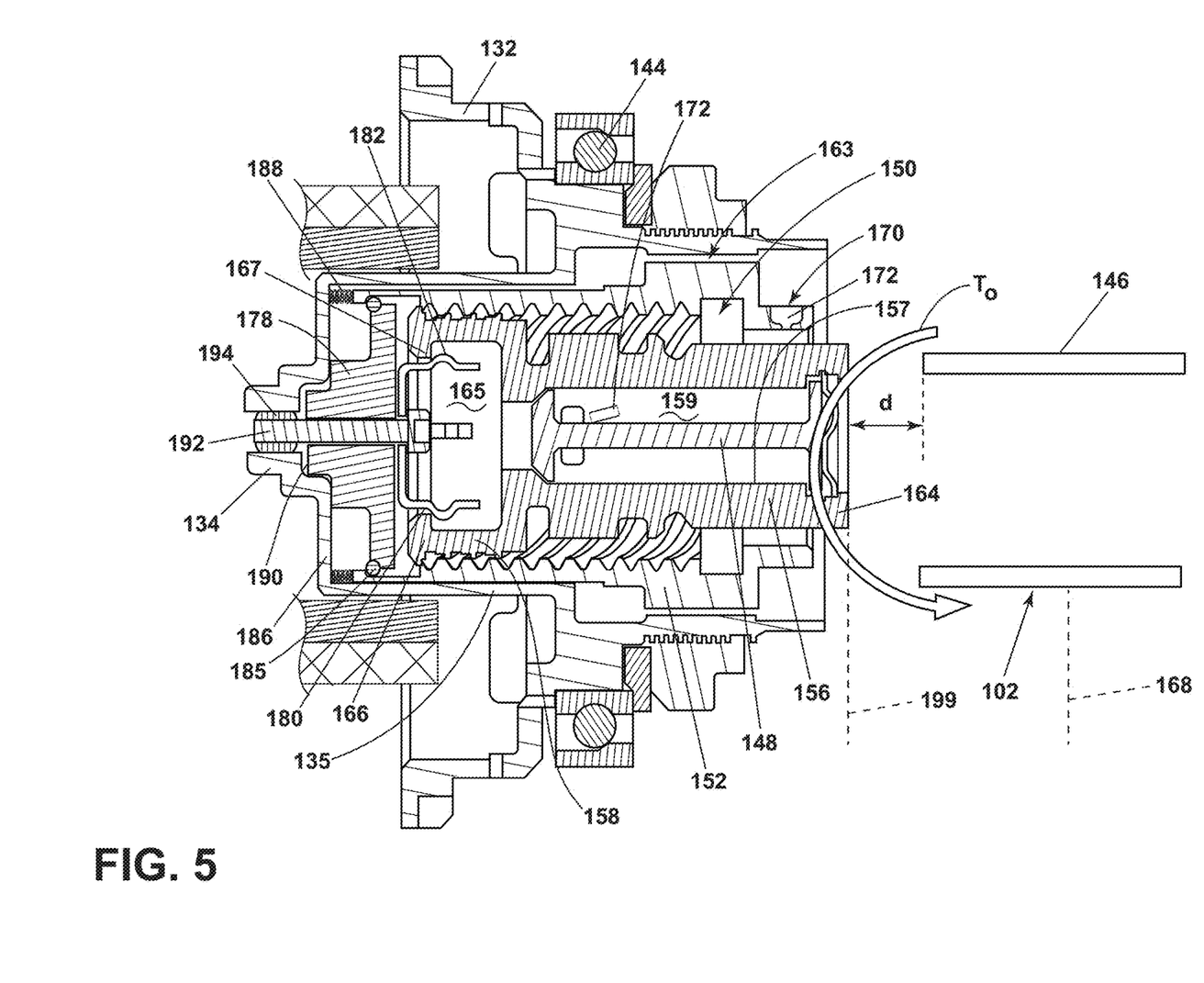
FIG. 5 is a sectional view of the decoupler of FIG. 2 in a second position according to an aspect of the disclosure described herein.

The shear pin 172 can have a threshold strength that is greater than that which occurs under normal operating conditions (e.g., torque T in FIG. 3) and less than that which occurs during a backdrive (e.g., torque $T_o$ in FIG. 5). An overrunning torque (To) at backdrive is greater than the torque (T) under normal operating conditions. The threshold strength is related to the overrunning torque (To), or reverse driving torque, such that the shear pin 172 remains intact during normal operation and shears off during a backdrive event exceeding a predetermined overrunning torque (To).

A pin receptacle 148 can be disposed within the output shaft 156. The pin receptacle 148 can have a substantially "I" shape and be disposed within the output shaft with the long "I" portion aligned with the centerline (CL). The ends of the "I" together with the long "I" portion and an interior wall 157 of the output shaft 156 can define a holding area 159 for at least a portion of the shear pin 172 in a backdrive event.

A holder 178 can define the closed end 174 of hollow shaft 160, and in particular the threaded interior 152. A shaft retaining feature, by way of non-limiting example, can be a retaining clip 180 that can be secured to the holder 178. The retaining clip 180 can be annular and include at least one bump 182. The hollow shaft 152 can terminate in an annular recess 184. At least a portion of the holder 178 can be received in the annular recess 184. A circular ring 185 can be disposed between the annular recess 184 and the holder 178 to further define the closed end 174.

The drive shaft assembly 135 can terminate in a base portion 186 spaced from the threaded interior 152. A wave spring 188 can be located between the base portion 186 and the hollow shaft 160 to axially space the base portion 186 from the hollow shaft 160. The wave spring 188 can be preloaded to secure at least a portion of the hollow shaft 160 against the ring 185 and the holder 178 at the annular recess 184. In other words, the ring 185 provides an interface between the hollow shaft 160 and the holder 178. Therefore, the wave spring 188 can axially align the hollow shaft 160 within the drive shaft assembly 135 while the ring 185 aligns the entirety of the hollow shaft 160, axially and radially, via the holder 178. The base portion 186 can include an indentation 190 for receiving at least a portion of the holder 178. A fastener, by way of non-limiting example a bolt 192 can couple the retaining clip 180 to the holder 178 and the holder 178 to the drive shaft 134 at the recess 184. A nut 194 can be located in the drive shaft 134 for receiving the bolt 192 along the centerline (CL). Together the wave spring 188, ring 185, and holder 178 provide alignment of the output shaft 156 and the AGB interface 146. Further, this arrangement, along with the spline connection 163, provides movement and versatility within the decoupler housing 132 to account for vibrations during connection, operation, and a backdrive event where decoupling is necessary.

Figure 4:
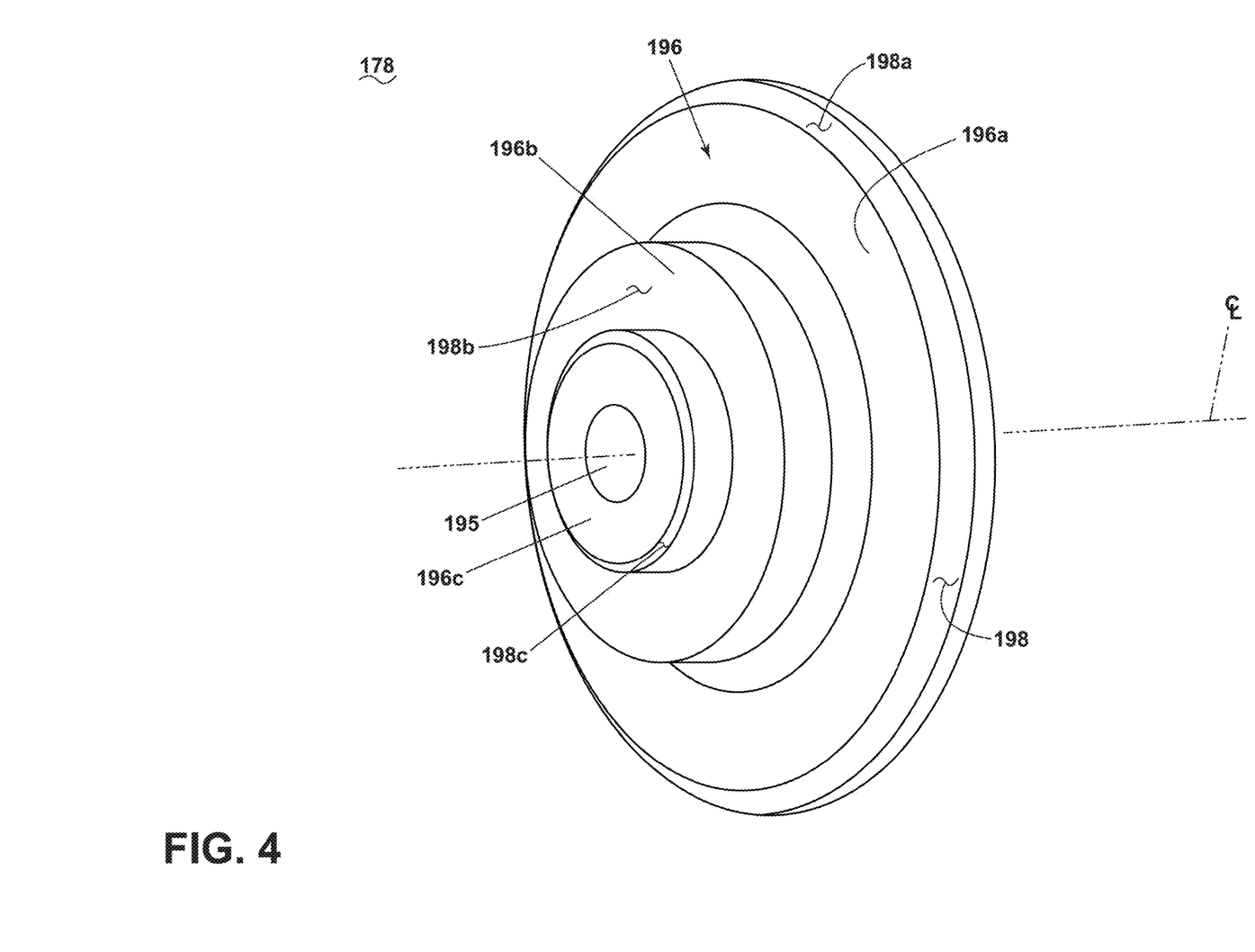
FIG. 4 is a perspective view of the holder from FIG. 3 according to an aspect of the disclosure described herein.

Turning to FIG. 4, an enlarged perspective view of the holder 178 is illustrated. The holder 178 defines at least one tier, by way of non-limiting example, a first tier 196a, a second tier 196b, and a third tier 196c. A thru hole 195 can be located in the center of the holder 178 and be aligned along the centerline (CL) when assembled. The at least one tier can expand out from the thru hole 195 to define the holder 178 with an annular shape. In other words, the holder can be shaped like a tiered cake on its side. The at least one tier 196 can define at least one engagement surface 198, by way of non-limiting example a first engagement surface 198a, a second engagement surface 198b, and a third engagement surface 198c.

Referring to FIGS. 3 and 4, the first tier 196a can be received in the annular recess 184 and the first engagement surface 198a can be configured to engage with the ring 185. The second tier 196b can be received in the drive shaft assembly 135 and the second engagement surface 198b can be configured to engage with the base portion 186 of the drive shaft assembly 135. The third tier 196c can be received in the indentation 190 and the third engagement surface 198c can be configured to engage with at least a portion of the drive shaft assembly 135. Multiple engagement surfaces 198 enable the holder to maintain alignment of the drive shaft assembly 135, the hollow shaft 160, and the output shaft 156.

FIG. 5 is an enlarged view of the decoupler assembly 150 with the first end 164 of the output shaft 156 in a second position 199. The lip 167 at the second end 166 of the output shaft 156 can be engaged with the bump 182 of the retaining clip 180 in order to hold the output shaft 156 in the second position 199. The output shaft 156 retracts axially into the threaded interior 152 to decouple from the AGB interface 146. The second, or uncoupled position 199, is where the output shaft 156 is disengaged from the AGB interface 146 and in turn the gas turbine engine 10. A distance (d) between an end of the air turbine starter 100 and the AGB interface 146 is smaller than the distance for a typical output shaft for an air turbine starter. A smaller distance (d) decrease the amount of space needed to connect the air turbine starter to the AGB 102, and decreases the material usage, in turn decreasing an overall weight of the air turbine starter 100. Additionally, a smaller distance (d) will reduce the total axial envelope of the air turbine starter 100, which helps in providing more design space for other systems around the AGB.

The lip 167 and bump 182 can be a snap fit connection preventing the retracted output shaft 156 from travelling back out of the threaded interior 152 toward the AGB interface 146.

During operation, when the first end 164 is in the first position 168 and the output shaft 156 is engaged with the AGB interface 146 (see FIG. 3), an overrunning torque below ($T_o$) a certain level to the air turbine starter 100 will cause the shear pin 172 and output shaft 156 to become loaded. An overrunning torque ($T_o$) at or above the certain level will cause the shear pin 172 and output shaft 156 to become fully loaded and meet the threshold strength of the shear pin 172. When the predetermined overrunning torque level ($T_o$) is met, the shear pin 172 will shear, or break, to unload the output shaft 156 in order to decouple the output shaft 156 causing the output shaft 156 to retract into the interior portion 154. The pin receptacle 148 can retain a shear pin portion 172b broken during the backdrive event in order to prevent movement of the shear pin portion 172b into the hollow portion 165 of the output shaft 156. A remaining shear pin portion 172a can stay in the holding area 159. Decoupling the air turbine starter 100 from the gas turbine engine 10 allows the engine 10 to continue functioning during a backdrive event at the predetermined overrunning torque ($T_o$).

Figure 6:
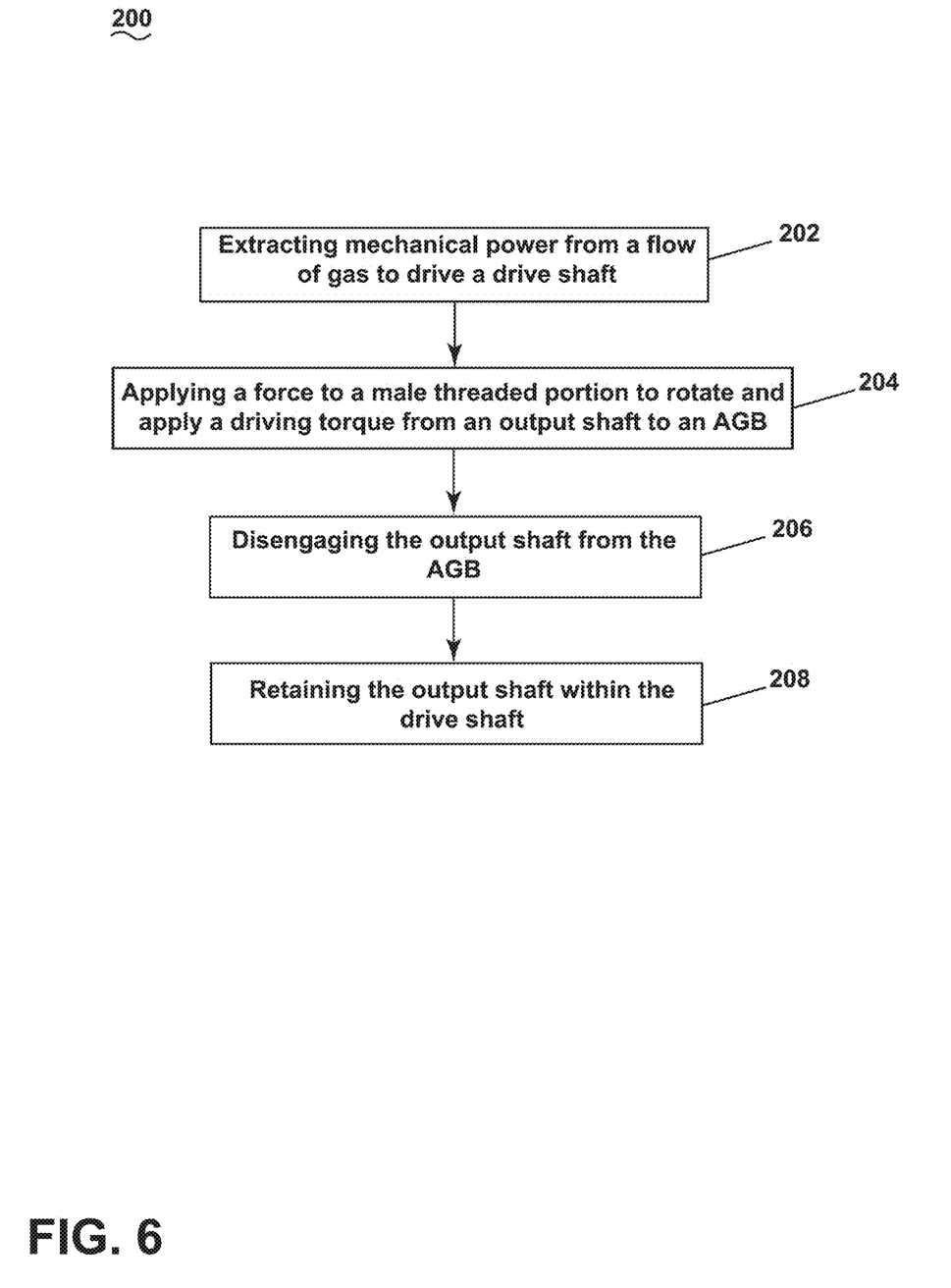
FIG. 6 is a flow chart of a method for operating an air turbine starter according to an aspect of the disclosure described herein.

A method 200 for operating the air turbine starter 100 is outlined in a flow chart in FIG. 6. The method 200 includes at block 202 extracting mechanical power from a flow of gas with the turbine member 116 that in turn drives the gear train 126 and clutch 142, including the drive shaft 134. At block 204, the drive shaft 134 and the threaded interior 152 apply a force (F) to the male threaded portion 158 to rotate the output shaft 156 and apply the driving torque (T) (see FIG. 3) to the AGB 102. The clutch 142 allows for overrun where overrunning torque is transmitted below a certain level and the output shaft 156, retainer 170, and female threaded portion 162 are loaded.

Overrunning torque ($T_o$) is caused by a drag torque from the air turbine starter 100. During normal operation this drag torque comes from windage from rotation of the rotor 144, the bearings 138 and viscous shear from the lubrication in the air turbine starter 100. During a backdrive event, the overrunning torque comes from all the bearings 130, 138, 143 and is amplified by the AGB 102. This increase in drag torque causes the shear pin 172 to shear.

In a backdrive event, at block 206, the retainer 170 ceases retention when the overrunning torque ($T_o$) reaches a certain level such that the output shaft 156 spins axially away from the AGB 102 until it is fully disengaged from the AGB 102. At block 208, the output shaft 156 moves into the interior portion 154 and is retained to prevent reengagement of the output shaft 156 to the AGB 102.

Many other possible embodiments and configurations in addition to that shown in the above figures are contemplated by the present disclosure. Additionally, the design and placement of the various components such as starter, AGB, or components thereof can be rearranged such that a number of different in-line configurations could be realized.

The embodiments disclosed herein provide a decoupler for decoupling, at a certain torque load, the output shaft from the AGB and in turn from the engine to prevent backdriving of the entire air turbine starter. Benefits associated with this decoupling include reducing the risk of spinning a damaged air turbine starter, which could cause additional damage to the air turbine starter if not decoupled. By decoupling, the retention retainer need only be replaced and the output shaft reset. This prevents more costly replacement parts in the event of additional damage.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

An air turbine starter for starting an engine, the air turbine starter comprising a housing with an air flow path extending between an inlet and an outlet, a turbine member located within the housing and having a turbine shaft and a plurality of blades extending from the turbine shaft, with at least a portion of the plurality of blades extending into the air flow path; a drive shaft assembly operably coupled to the turbine member, and having an interior portion; an output shaft extending between a first end and a second end, the output shaft movable between a first position, where the first end is coupled to the engine, and a second position, where the second end is disposed within the interior portion and the first end is uncoupled from the engine; and a decoupler assembly comprising a retainer connecting the drive shaft assembly to the output shaft, when the output shaft is in the first position, and disconnecting the drive shaft assembly from the output shaft, when a driving torque transmitted from the drive shaft assembly to the output shaft loads the retainer over a torque limit causing the output shaft to move into the second position.

The air turbine starter of any preceding clause, wherein the retainer is a shear pin extending axially through a portion of the output shaft and a portion of the drive shaft assembly and wherein the shear pin shears when an overrunning torque reaches the torque limit.

The air turbine starter of any preceding clause, further comprising a pin receptacle located within the output shaft.

The air turbine starter of any preceding clause, wherein the output shaft includes a lip at the second end.

The air turbine starter of any preceding clause, further comprising a shaft retaining feature disposed within the interior portion wherein the shaft retaining feature engages the lip to retain the output shaft in the second position.

The air turbine starter of any preceding clause, further comprising a hollow shaft disposed within the interior portion extending between a closed end and an open end with a female threaded portion defining a threaded interior and wherein the output shaft comprises a male threaded portion and the male threaded portion and the female threaded portion form a threaded connection.

The air turbine starter of any preceding clause, further comprising a holder defining at least one engagement surface and having a thru hole defining a holder centerline.

The air turbine starter of any preceding clause, further comprising a fastener received within the thru hole to secure the holder to the hollow shaft and define the closed end.

The air turbine starter of any preceding clause, wherein the hollow shaft further comprises an annular recess and the at least one engagement surface of the holder is received within the recess.

The air turbine starter of any preceding clause, further comprising a ring disposed between the annular recess and the at least one engagement surface.

The air turbine starter of any preceding clause, further comprising a wave spring disposed at between a base portion of the drive shaft assembly and the hollow shaft.

The air turbine starter of any preceding clause, wherein the wave spring preloads at least a portion of the annular recess of the hollow shaft against the ring.

A decoupler assembly for decoupling an output shaft from an engine, comprising a drive shaft; a hollow shaft having a threaded interior and at least partially disposed within the drive shaft; an output shaft extending between a first end and a second end, the second end comprising a threaded exterior operably coupled to the threaded interior of the hollow shaft, the output shaft axially moveable between a first position and a second position; and a retainer selectively operably coupling the output shaft to the threaded interior; wherein when a driving torque is transmitted from the drive shaft to the output shaft the retainer is not loaded, when an overrunning torque is transmitted below a torque limit the retainer is loaded, and when the overrunning torque reaches the torque limit the retainer uncouples the second end of the output shaft from the engine and the output shaft moves from the first position to the second position.

The decoupler assembly of any preceding clause, wherein the retainer is a shear pin extending axially through a portion of the output shaft and a portion of the drive shaft assembly and wherein the shear pin shears when an overrunning torque reaches the torque limit.

The air turbine starter of any preceding clause, wherein the output shaft includes a lip at the second end.

The decoupler assembly any preceding clause, further comprising a shaft retaining feature disposed within the threaded interior wherein the shaft retaining feature engages the lip to secure the output shaft in the second position.

The decoupler assembly of any preceding clause, further comprising a holder defining a closed end of the threaded interior and having at least one engagement surface.

The decoupler assembly of any preceding clause, wherein the hollow shaft further comprises an annular recess and the at least one engagement surface is received within the annular recess.

The decoupler assembly of any preceding clause, further comprising a ring disposed between the annular recess and the at least one engagement surface.

The decoupler assembly of any preceding clause, further comprising a wave spring disposed at a base portion of the drive shaft assembly to space the hollow shaft from the base portion and wherein the wave spring preloads at least a portion of the annular recess against the ring.

What is claimed is:

1. An air turbine starter for starting an engine, the air turbine starter comprising:
    a housing with an air flow path extending between an inlet and an outlet;
    a turbine member located within the housing and having a turbine shaft and a plurality of blades extending from the turbine shaft, with at least a portion of the plurality of blades extending into the air flow path;
    a drive shaft assembly operably coupled to the turbine member, and having an interior portion;
    a hollow shaft at least partially disposed within the interior portion extending between a closed end and an open end;
    a holder coupled to the hollow shaft and defining the closed end and defining at least one engagement surface;
    an output shaft extending between a first end and a second end, the output shaft movable between a first position, where the first end is coupled to the engine, and a second position, where the second end is disposed within the interior portion and the first end is uncoupled from the engine; and
    a retainer to connect the drive shaft assembly to the output shaft when the output shaft is in the first position, and to disconnect the drive shaft assembly from the output shaft when a driving torque transmitted from the drive shaft assembly to the output shaft loads the retainer over a torque limit and causes the output shaft to move into the second position.

2. The air turbine starter of claim 1, wherein the at least one engagement surface of the holder includes a thru hole.

3. The air turbine starter of claim 2, further comprising a fastener received within the thru hole and configured to secure the holder to the hollow shaft.

4. The air turbine starter of claim 1, further comprising a fastener that secures the holder to the hollow shaft.

5. The air turbine starter of claim 1, wherein the hollow shaft and the output shaft form a threaded connection.

6. The air turbine starter of claim 1, wherein the hollow shaft further comprises an annular recess and the at least one engagement surface of the holder is received within the annular recess.

7. The air turbine starter of claim 6, further comprising a ring disposed between the annular recess and the at least one engagement surface.

8. The air turbine starter of claim 7, wherein the ring provides alignment for the hollow shaft both axially and radially.

9. The air turbine starter of claim 7, further comprising a wave spring disposed at between a base portion of the drive shaft assembly and the hollow shaft.

10. The air turbine starter of claim 9, wherein the wave spring preloads at least a portion of the annular recess of the hollow shaft against the ring.

11. The air turbine starter of claim 9, wherein the wave spring axially aligns the hollow shaft within the drive shaft assembly.

12. The air turbine starter of claim 1, wherein the drive shaft assembly terminates in a base portion spaced from a threaded interior.

13. The air turbine starter of claim 1, wherein the retainer is a shear pin configured to shear when an overrunning torque reaches the torque limit.

14. The air turbine starter of claim 13, further comprising a pin receptacle located within the output shaft.

15. The air turbine starter of claim 14, wherein the pin receptacle is an I shape.

16. The air turbine starter of claim 15, wherein a holding area is defined in at least a portion of the pin receptacle for receiving a first portion of the shear pin when sheared.

17. The air turbine starter of claim 16, wherein the pin receptacle retains a second portion of the shear pin when sheared.

18. The air turbine starter of claim 1, wherein the output shaft includes a lip and further comprising a shaft retaining feature disposed within the interior portion wherein the shaft retaining feature engages the lip to retain the output shaft in the second position.

19. The air turbine starter of claim 1, wherein the holder is received within the hollow shaft to define the closed end thereof.

20. The air turbine starter of claim 1, wherein the second end of the output shaft is at least one of disposed within the hollow shaft or coupled to the hollow shaft when in the second position.

* * * * *